(12) United States Patent
Chang et al.

(10) Patent No.: US 6,407,935 B1
(45) Date of Patent: Jun. 18, 2002

(54) HIGH FREQUENCY ELECTRONIC BALLAST WITH REACTIVE POWER COMPENSATION

(75) Inventors: Chin Chang, Yorktown Heights; Gert W. Bruning, Sleepy Hollow, both of NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/580,170

(22) Filed: May 30, 2000

(51) Int. Cl.$^7$ .............................. H02J 3/00; H05B 37/02
(52) U.S. Cl. ........................................ 363/34; 315/308
(58) Field of Search .................... 363/34, 37; 315/347, 315/308

(56) References Cited

U.S. PATENT DOCUMENTS

| | | | |
|---|---|---|---|
| 5,332,951 A | | 7/1994 | Turner et al. ............... 315/209 |
| 5,539,630 A | * | 7/1996 | Pietkiewicz et al. .......... 363/17 |
| 5,781,418 A | | 7/1998 | Chang et al. ................. 363/16 |
| 5,808,879 A | * | 9/1998 | Liu et al. ..................... 363/17 |
| 5,838,558 A | * | 11/1998 | Tan et al. ..................... 363/91 |
| 5,907,223 A | * | 5/1999 | Gu et al. ..................... 315/247 |
| 5,999,433 A | * | 12/1999 | Hua et al. .................... 363/132 |
| 6,072,710 A | * | 6/2000 | Chang ......................... 363/132 |
| 6,088,250 A | * | 7/2000 | Siri ............................. 363/97 |
| 6,181,079 B1 | * | 1/2001 | Chang et al. ............... 315/247 |

* cited by examiner

Primary Examiner—Adolf Deneke Berhane
(74) Attorney, Agent, or Firm—Dicran Halajian

(57) ABSTRACT

A lamp ballast circuit which provides a magnetizing inductance to a lamp ballast circuit transformer. A DC voltage and current supply source energize a pair of transistors which provide an AC voltage and current. The transformer includes a primary winding that receives the AC voltage and current. At least one lamp is coupled to the transformer secondary winding via a capacitor. The circuit has an optimal magnetizing inductance such that the transformer input voltage and current are substantially in phase with each other, thereby substantially reducing or eliminating the reactive power transferred through the output transformer. In a preferred embodiment, the magnetizing inductance, $L_{102}$, is given as:

$$L_\chi = [1-(\omega_s C_1 R_1)^2]/n^2 \omega_s^2 C_1,$$

wherein $\omega_s$ is an operating frequency, $C_1$ is the capacitance of the capacitor, $R_1$ is the resistance of the at least one lamp, and n is the secondary-to-primary side turns ratio of the transformer.

28 Claims, 3 Drawing Sheets

HIGH FREQUENCY ELECTRONIC BALLAST WITH REACTIVE POWER COMPENSATION

FIELD OF THE INVENTION

The present invention is directed to a lamp ballast circuit, and more particularly to a ballast circuit wherein the magnetizing inductance of the output transformer is adjusted in order to compensate for the reactive power induced by a ballast capacitor.

BACKGROUND OF THE INVENTION

Fluorescent lighting is a very common type of illumination. Fluorescent lamps function when an electrical arc is established between two electrodes located at opposite ends of the lamp. The electrical arc is established by supplying a proper voltage and current to the lamp. The lamp is filled with an ionizable gas and a very small amount of vaporized mercury. When the arc is established, collisions occur between the electrons and the mercury atoms, causing the emission of ultraviolet energy. The fluorescent lamps have a phosphorous coating on their inner surface, which transforms the ultraviolet energy into diffused, visible light.

In order to establish the electrical arc, and thus turn on the lamp, a high voltage is typically required. However, once the lamp has been turned on, a lesser voltage is required to maintain the lamp's operation. In order to start and operate a fluorescent lamp, a fluorescent lamp ballast is used. Among other functions (such as limiting the current flow through the lamp once it has already been started), a ballast is a device which provides the appropriate voltage to establish the arc through the lamps.

FIG. 1 shows a schematic diagram of a prior art ballast circuit 100 which employs a DC supply source 150. The DC supply source 150 is coupled to a pair of enhancement mode n-channel MOSFET transistors 102 and 104, which form a half-bridge structure. When alternately turned "on" and "off", transistors 102 and 104 provide an AC voltage signal to the lamps. The drain terminal of transistor 102 and the source terminal of transistor 104 are connected at node 106. Node 106 is further coupled to current blocking capacitor 114 and resonant inductor 112, which are coupled in series. Current blocking capacitor 114 prevents DC current from flowing through the lamps.

Resonant inductor 112 is further coupled to a primary winding 110a of transformer 110. Resonant capacitor 116 is coupled in parallel across primary winding 110a. Secondary winding 110b of transformer 110 is coupled to a series combination of capacitors 122, 124, 126 and 128 and fluorescent lamps 132, 134, 136 and 138 coupled together in parallel. Capacitors 122, 124, 126 and 128 control the current flow through lamps 132, 134, 136 and 138, respectively.

One problem which is experienced by prior art lamp ballasts is that the voltage and current signals generated at secondary winding 110b of transformer 110 are out of phase with respect to each other. As a result, the primary winding voltage and current signals of transformer 110 are also out of phase with respect to each other. Thus, the power transferred through transformer 110 to drive the lamps is comprised of both a real power component (i.e.—the power provided to the lamps) and a reactive power component, which is described below.

Reactive power exists in a circuit due to an imbalance between peak magnetic energy storage and the peak electric energy storage in a circuit. For instance, the capacitor in the circuit stores its maximum energy when the voltage is maximum. The inductor stores its maximum energy when its current is maximum, which occurs when the voltage is zero because of the 90 degree phase shift. Since the ballasting capacitors 122, 124, 126 and 128 and the lamp load require energy at different times in the AC cycle, additional energy must periodically be supplied by the circuit in order to balance the load (i.e.—the lamps). This energy, transferred in and out of ballasting capacitors 122, 124, 126 and 128 during each cycle, is the reactive power.

Because of the additional reactive power that is not transferred to the load itself, prior art circuits are configured with a transformer that is large enough to handle the additional reactive power. In the case of the circuit described in FIG. 1, the reactive power is transferred by transformer 110. In order to insure that the reactive power is always sufficient to balance the load, transformer 110 must be sized significantly larger than if it was not required to transfer reactive power. The overdesign of this transformer undesirably adds to the cost and to the physical size of the lamp ballast circuit.

Therefore, there exists a need for a lamp ballast circuit that reduces the reactive power transferred through the output transformer.

SUMMARY OF THE INVENTION

The present invention is directed to a lamp ballast circuit with an adjusted magnetizing inductance of the lamp ballast circuit transformer. By optimizing the magnetizing inductance of the transformer, the voltage and current signals received at the primary side of the transformer are brought in phase relative to each other, and the reactive power transferred by the transformer is substantially reduced or eliminated. Since the transformer is not required to transfer reactive power, it may be sized significantly smaller, thereby decreasing the cost and the physical size of the lamp ballast circuit.

The lamp ballast circuit comprises a DC voltage and current supply source. A pair of transistors is coupled to the DC supply source and is configured, upon application of the DC signal, to provide an AC voltage and current signal, wherein each of the AC voltage and current signals has a corresponding phase. A transformer includes a primary and a secondary winding, wherein the primary winding of the transformer receives the AC voltage and current signals. At least one lamp is coupled to the secondary winding via a capacitor. The circuit has an optimal magnetizing inductance such that the AC voltage and current signals received at the primary side of the transformer are substantially in phase with each other, thereby substantially reducing or eliminating the reactive power transferred by the transformer. In a preferred embodiment, the magnetizing inductance, $L_m$, is given as:

$$L_m = [1+(\omega_s C_1 R_1)^2]/n^2 \omega_s^2 C_1,$$

wherein $\omega_s$ is an operating frequency, $C_1$ is the capacitance of the capacitor, $R_1$ is the resistance of the at least one lamp, and n is a secondary-to-primary side turns ratio of the transformer.

The above description sets forth rather broadly the more important features of the present invention in order that the detailed description thereof that follows may be understood, and in order that the present contributions to the art may be better appreciated. Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWINGS

In the drawings, in which like reference characters denote similar elements throughout the several views.

It is to be understood that the drawings are not necessarily drawn to scale, but that they are merely conceptual in nature.

DETAILED DESCRIPTION OF THE PRESENTLY PREFERRED EMBODIMENTS

The present invention, in accordance with one embodiment, is a lamp ballast circuit which adjusts the magnetizing inductance of a lamp ballast circuit transformer. By optimizing the magnetizing inductance of the transformer, the voltage and current signals received by the transformer are brought into phase relative to each other, and the reactive power transferred through the output transformer is substantially reduced or eliminated.

Figure 1:
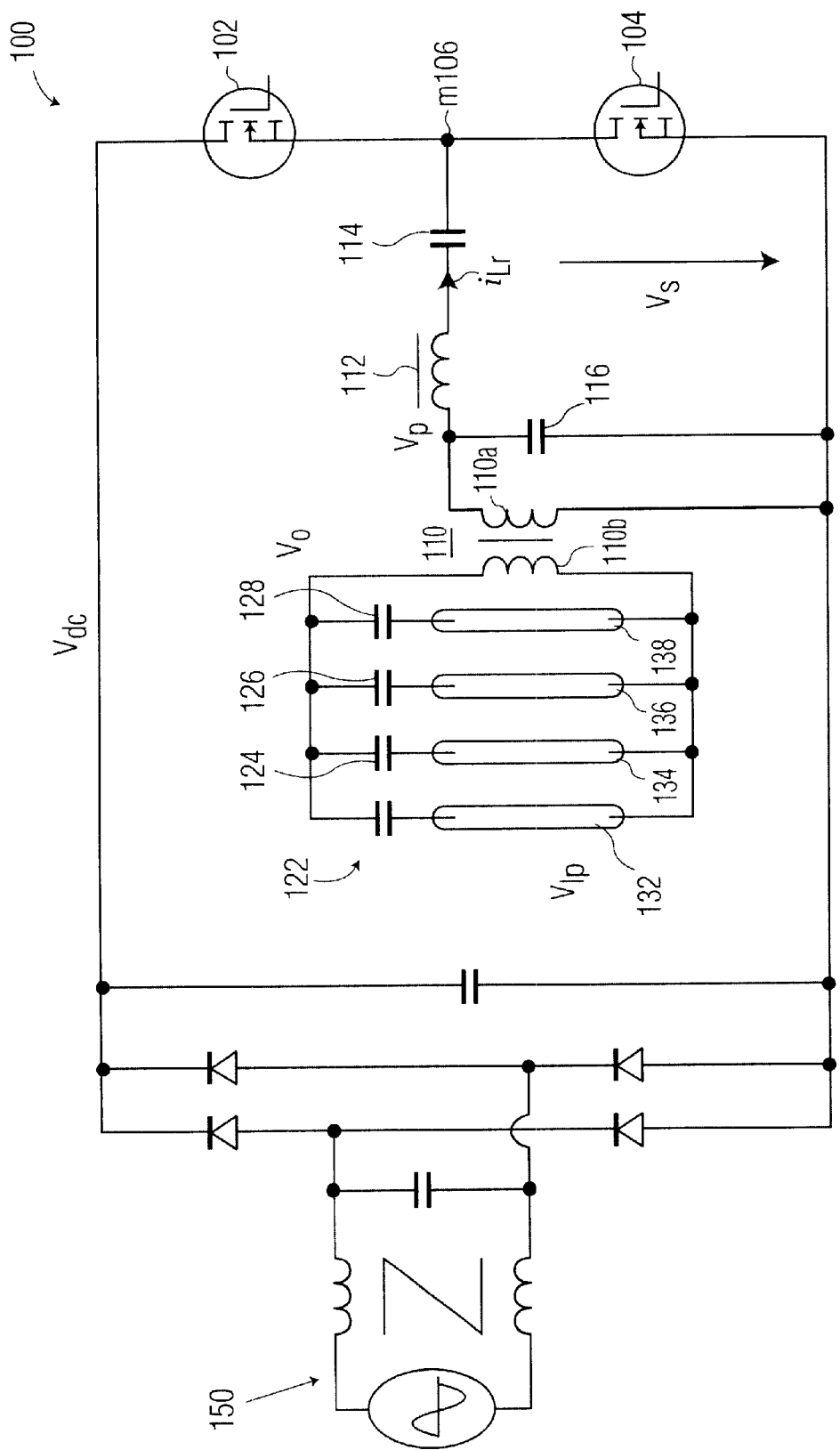
FIG. 1 is a schematic diagram of a prior art lamp ballast circuit.
Figure 2:
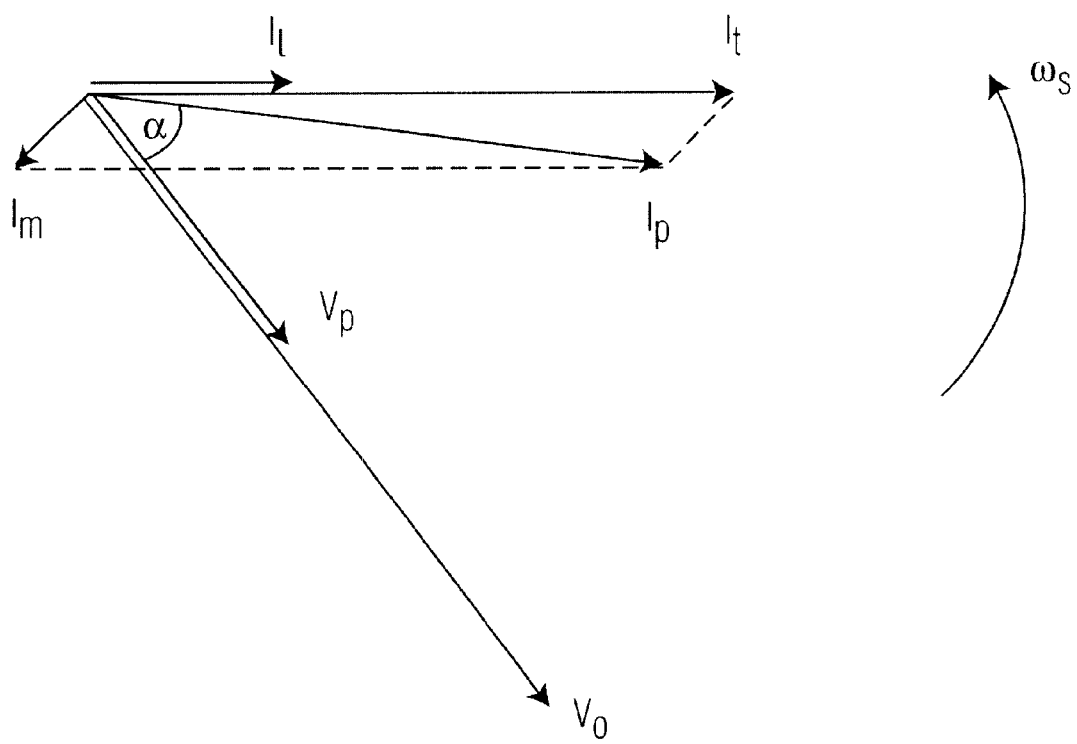
FIG. 2 is a phasor diagram for a prior art lamp ballast circuit.

In accordance with the prior art, FIG. 2 is a phasor diagram which employs vectors to illustrate the reactive power required to be provided by transformer 110 of FIG. 1. For instance, FIG. 2 shows that vector $I_p$, which represents the current supplied to transformer 110, is α degrees out of phase with $V_p$, which represents the voltage supplied to transformer 110. The magnetizing current of the circuit, represented by the vector $I_m$, is supplied by transformer 110 when necessary to balance the lamp load.

Figure 3:
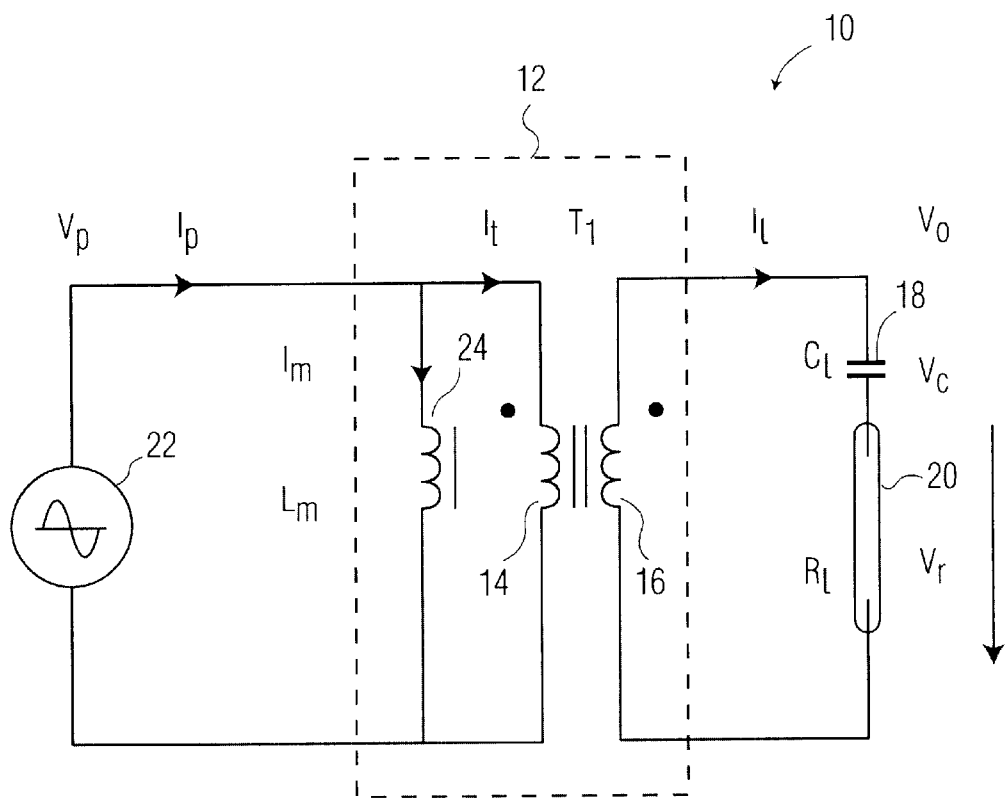
FIG. 3 is a schematic diagram of a lamp ballast circuit in accordance with one embodiment of the invention.

FIG. 3 is a circuit diagram that illustrates the salient features of a lamp ballast circuit 10, in accordance with one embodiment of the present invention. The circuit shown in FIG. 3 is suitable to be used in the ballast of a fluorescent lamp. However, the present invention is not intended to be limited in scope in this regard, as it is suitable to be employed in other ballast designs, such as LCD backlighting.

Generally, FIG. 3 illustrates a circuit that is an equivalent design of that shown in FIG. 1. The AC sinusoidal supply source 22 is a schematic representation of and is equivalent to the part of the circuit shown in FIG. 1 that is coupled to the primary side 110a of the transformer 110. FIG. 3 simplifies the illustration of the output stage of the circuit shown in FIG. 1. Referring to FIG. 1, due to the switching action of the transistors, the voltage across the resonant capacitor 116 is substantially sinusoidal and is shown therein as vector $V_p$. Similarly, FIG. 3 shows vector $V_p$, which illustrates the voltage which may exist across a resonant capacitor (not shown in FIG. 3) and which is again substantially sinusoidal. FIG. 3 also shows a transformer 12, which comprises a primary winding 14 and a secondary winding 16. Coupled in parallel across primary winding 14 is magnetizing inductor 24, which is further explained below.

On the secondary side of transformer 110, circuit 10 comprises a lamp 20 in series with a capacitor 18. In FIG. 3, parallel-connected lamps, such as those illustrated in, FIG. 1, are combined into a single equivalent lamp 20 for the sake of simplicity. Thus, lamp resistance $R_1$ of lamp 20 is the resistance of a single lamp or else is equivalent to the combined resistance of several parallel-connected lamps. Similarly, the parallel-connected capacitors, such as those illustrated in FIG. 1, are combined into a single capacitor 18 coupled in series with lamp 20. Thus, capacitance $C_1$ of capacitor 20 is the capacitance of a single capacitor or else is equivalent to the combined capacitance of several parallel-combined capacitors.

According to a preferred embodiment of the invention, the magnetizing inductance of magnetizing inductor 24 is configured so that the voltage and current received by primary winding 110a of transformer 110 are in phase relative to each other. Thus, transformer 110 does not transfer any reactive power. The additional energy (i.e.—the reactive power) which would typically be required to be supplied by the circuit in order to balance the load is compensated by the magnetizing inductance of magnetizing inductor 24.

Figure 4:
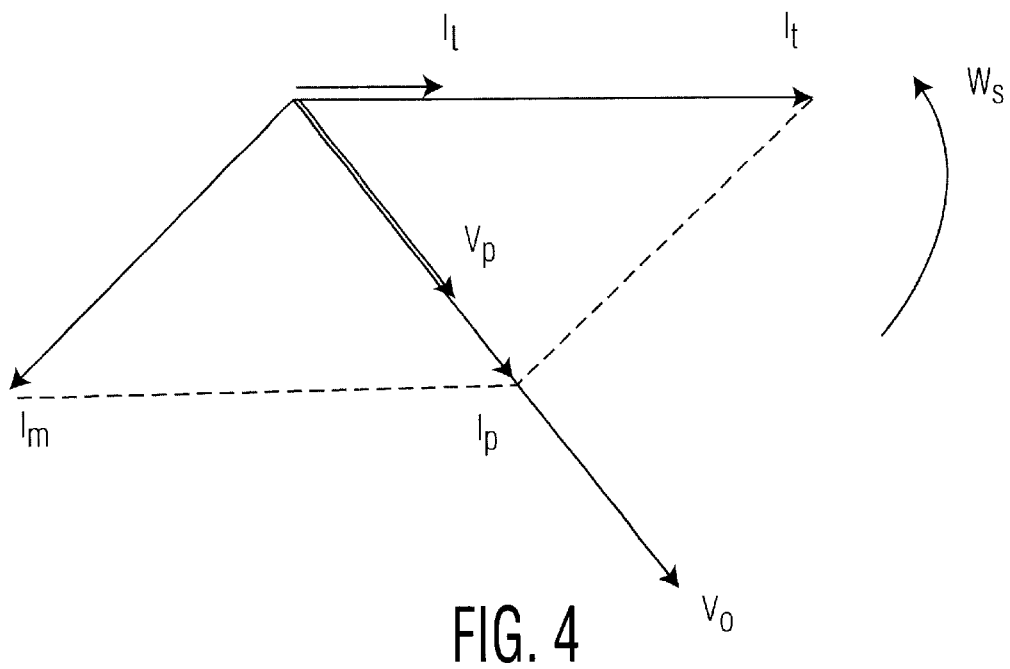
FIG. 4 is a phasor diagram for a lamp ballast circuit, in accordance with one embodiment of the present invention.

FIG. 4 is a phasor diagram which employs vectors to illustrate the advantage of the present invention. Specifically, according to one embodiment of the present invention, reactive power required to balance the load is provided by magnetizing inductor 24 of transformer 110. For instance, in comparison to the phasor diagram of FIG. 2, the phasor diagram of FIG. 4 shows an increase of vector $I_m$. Vector $I_m$ represents the magnetizing current through magnetizing inductor 24.

By optimizing the current $I_m$ through the magnetizing inductor, the current $I_p$ provided to transformer 12 is brought into phase with the voltage $V_p$ at transformer 12. This is shown in FIG. 4, wherein the angle α between vector $I_p$ and vector $V_p$ is substantially zero. At this point, the current $I_p$ is also reduced. It is noted that in accordance with one embodiment of the invention, with the increasing magnetizing current $I_m$, there is a point when $I_p$ reaches its substantially minimal value, at which $V_p$ and $I_p$ are in phase relative to each other.

According to one embodiment of the invention, the optimal value of the magnetizing inductance $L_m$ can be determined for a given operating frequency $\omega_s$ as:

$$L_m = [1+(\omega_s C_1 R_1)^2]/n^2\omega_s^2 C_1, \qquad \text{[Equation 1]}$$

wherein $C_1$ is the capacitance of capacitor 18 (or the equivalent capacitance of more than one parallel-connected capacitors), $R_1$ is the resistance of the lamps (or the equivalent resistance of more than one parallel-connected lamps) and n is the secondary-to-primary side turns ratio of transformer 12.

When the magnetizing inductance $L_m$, is optimized at this value, the reactive power which is typically transferred through the transformer is substantially eliminated. As a result, the size of the transformer may be significantly smaller, since the transformer is no longer required to transfer a significant amount of reactive power. Thus, the inclusion of magnetizing inductor 24 insures that the reactive power is always sufficient to balance the load. It is noted, however, that the present invention also contemplates that, instead of employing a magnetizing inductor 24 as shown in FIG. 3, a transformer is employed in which the primary-to-secondary side turns ratio of the transformer provides for the optimal magnetizing inductance as defined by Equation 1 above.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A ballast circuit, comprising:
   a transformer including a primary and a secondary winding, wherein said primary winding of said transformer receives an AC voltage and current;
   at least one lamp coupled to said secondary winding;
   said circuit having an optimized magnetizing inductance, said optimized magnetizing inductance causing said transformer input voltage and current to be in phase relative to each other.

2. The circuit according to claim 1, wherein said circuit further comprises a DC voltage and current supply source and a pair of transistors coupled to said DC voltage and current supply source and configured, upon application of a DC voltage and current, to provide said AC voltage and current to the transformer primary winding.

3. The circuit according to claim 1, wherein said at least one lamp is coupled in series with a corresponding capacitor.

4. The circuit according to claim 3, wherein said magnetizing inductance, $L_m$, is given as:

$$L_m = [1+(\omega_s C_1 R_1)^2]/n^2 \omega_s^2 C_1,$$

wherein $\omega_s$ is an operating frequency, $C_1$ is a capacitance of said capacitor, $R_1$ is a resistance of said at least one lamp, and n is a secondary-to-primary side turns ratio of said transformer.

5. The circuit according to claim 4, wherein said at least one lamp comprises a plurality of parallel-connected lamps, and said resistance $R_1$ is an equivalent resistance of said plurality of said lamps.

6. The circuit according to claim 5, wherein said plurality of parallel-connected lamps are coupled in series to a corresponding plurality of capacitors, and said capacitance $C_1$ is an equivalent capacitance of said plurality of said capacitors.

7. The circuit according to claim 1, wherein said circuit further comprises a magnetizing inductor coupled in parallel across said primary winding for providing said magnetizing inductance.

8. The circuit according to claim 4, wherein the primary-to-secondary turns ratio n of said transformer is selected so as to optimize said magnetizing inductance.

9. A method of operating a ballast circuit, said method comprising the steps of:
   receiving an AC voltage and current at a primary winding of a transformer, said transformer having said primary winding and a secondary winding;
   coupling at least one lamp to said secondary winding;
   providing a transformer magnetizing inductance having an optimized value which causes said transformer input voltage and current to be in phase relative to each other.

10. The method according to claim 9, further comprising the step of coupling the ballast circuit to a DC voltage and current supply source.

11. The method according to claim 9, further comprising the step of coupling said at least one lamp in series with a corresponding capacitor.

12. The method according to claim 11, wherein said magnetizing inductance, $L_m$, in said providing step is given as:

$$L_m = [1+(\omega_s C_1 R_1)^2]/n^2 \omega_s^2 C_1,$$

wherein $\omega_s$ is an operating frequency, $C_1$ is a capacitance of said capacitor, $R_1$ is a resistance of said at least one lamp, and n is a secondary-to-primary side turns ratio of said transformer.

13. The method according to claim 12, wherein said coupling step further comprises coupling a plurality of parallel-connected lamps, and said resistance $R_1$ is an equivalent resistance of said plurality of said lamps.

14. The method according to claim 13, further comprising coupling said plurality of parallel-connected lamps in series to a corresponding plurality of capacitors, and said capacitance $C_1$ is an equivalent capacitance of said plurality of said capacitors.

15. The method according to claim 9, further comprising the step of providing in said circuit a magnetizing inductor coupled in parallel with the transformer primary winding, said magnetizing inductor configured to provide said magnetizing inductance.

16. The method according to claim 9, further comprising the step of selecting the primary-to-secondary turns ratio n of said transformer so as to optimize said magnetizing inductance.

17. A high frequency electronic ballast circuit for one or more discharge lamps, the ballast circuit comprising:
   input terminals for connection to a source of DC supply voltage,
   means coupled to the input terminals for deriving an AC voltage and current,
   a transformer having a primary winding which receives said AC voltage and current,
   a load circuit including at least one discharge lamp in series circuit with a capacitor,
   means for coupling the load circuit to a secondary winding of said transformer, and
   means including a magnetizing inductance having an optimized value for compensating reactive currents in the transformer by bringing the transformer primary winding voltage and current in phase with one another.

18. The high frequency electronic ballast circuit as claimed in claim 17 wherein said AC voltage and current deriving means comprises at least one transistor coupled to the input terminals, the electronic ballast circuit further comprising an LC resonant circuit coupled to the at least one transistor and to the transformer primary winding, wherein the inductance value of said magnetizing inductance is chosen so as to counteract capacitive reactive current from a resonant capacitor of said LC resonant circuit.

19. The high frequency electronic ballast circuit as claimed in claim 18 wherein said magnetizing inductance includes a magnetizing inductor coupled in parallel with said transformer primary winding.

20. The high frequency electronic ballast circuit as claimed in claim 17 wherein the primary-to-secondary turns ratio (n) of said transformer is selected so as to optimize said magnetizing inductance in a manner to compensate said reactive currents in the transformer.

21. The high frequency electronic ballast circuit as claimed in claim 17 wherein said at least one lamp comprises a plurality of parallel connected lamps coupled in series with a corresponding plurality of respective capacitors.

22. The high frequency electronic ballast circuit as claimed in claim 17 further comprising:

an LC resonant circuit including an inductor coupled to the AC voltage and current deriving means and to the transformer primary winding and a resonant capacitor coupled across the transformer primary winding.

23. The high frequency electronic ballast circuit as claimed in claim 17 wherein the load circuit is directly coupled to the transformer secondary winding.

24. The high frequency electronic ballast circuit as claimed in claim 17 wherein the magnetizing inductance is determined, at least in part, by one of the following circuit parameters, the circuit operating frequency ($\omega_s$), the resistance ($R_i$) of the at least one lamp, the capacitance ($C_i$) of the capacitor, and the turns ratio (n) of the transformer.

25. The high frequency electronic ballast circuit as claimed in claim 17 wherein said means for deriving the AC voltage and current comprise a DC/AC converter coupled to the input terminals.

26. The high frequency electronic ballast circuit as claimed in claim 17 wherein said magnetizing Inductance includes a magnetizing inductor coupled in parallel with said transformer primary winding.

27. The high frequency electronic ballast as claimed in claim 17 wherein said magnetizing inductance, $L_m$, is given as:

$$L_m = [1+(\omega_s C_1 R_1)^2]/n^2 \omega_s^2 C_1,$$

wherein $\omega_s$ is an operating frequency, $C_1$ is a capacitance of said capacitor, $R_1$ is a resistance of said at least one lamp, and n is a secondary-to-primary side turns ratio of said transformer.

28. The high frequency electronic ballast as claimed in claim 17 wherein the value of the magnetizing inductance is chosen so as to optimize the current ($I_m$) therein and thereby bring the transformer primary winding voltage and current in phase with one another and substantially reduce the level of any reactive power transferred through said transformer.

* * * * *